Figure 1:
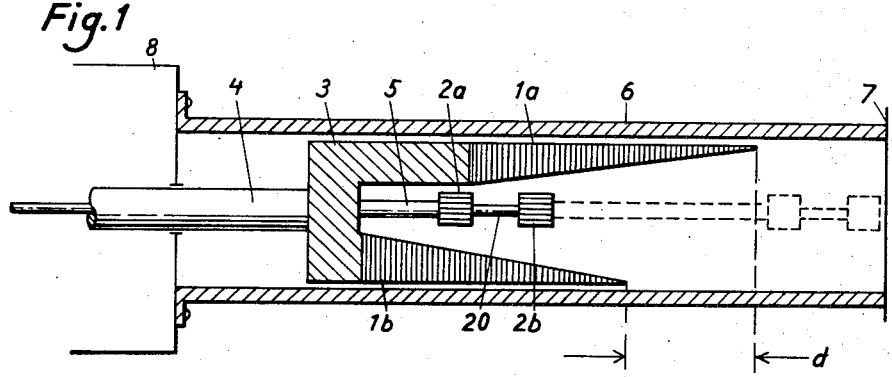

United States Patent [19]
Endersz

[11] 3,828,282
[45] Aug. 6, 1974

[54] VARIABLE WAVE-GUIDE IMPEDANCE FOR MEASUREMENT AND CALIBRATION OF AN ACTIVE MICROWAVE ELEMENT

[75] Inventor: György Géza Endersz, Alvsjo, Sweden

[73] Assignee: Telefonaktiebolaget L M Ericsson, Stockholm, Sweden

[22] Filed: Mar. 8, 1973

[21] Appl. No.: 339,143

[30] Foreign Application Priority Data
Mar. 21, 1972 Sweden.............................. 3622/72

[52] U.S. Cl.............. 333/22 R, 333/33, 333/81 B, 333/98 R
[51] Int. Cl........ H01p 1/26, H01p 1/28, H03h 7/38
[58] Field of Search............. 333/22, 81 B, 33, 98 R

[56] References Cited
UNITED STATES PATENTS
2,419,613  4/1947  Webber............................. 333/22 R
2,701,861  2/1965  Andrews........................... 333/22 R
2,950,442  8/1960  Scovil et al..................... 333/81 B X Primary Examiner—James W. Lawrence
Assistant Examiner—Marvin Nussbaum
Attorney, Agent, or Firm—Hane, Baxley & Spiecens

[57] ABSTRACT

A variable waveguide impedance for the measurement of an active microwave element, for example in order to obtain a value of the figure of merit of the element, comprises a non-reflecting terminator consisting of two pyramidal parts mounted on a yoke which in turn is mounted on a first hollow shaft, and a short-circuit device consisting of two metallic cylinders mounted on a second shaft. The second shaft is displaceable and lockable in the first shaft and the whole impedance device is arranged in a waveguide section in relation to which the impedance can be displaced by means of the first shaft. The active microwave element is connected to the waveguide section in order to establish a microwave field in the same.

9 Claims, 3 Drawing Figures

VARIABLE WAVE-GUIDE IMPEDANCE FOR MEASUREMENT AND CALIBRATION OF AN ACTIVE MICROWAVE ELEMENT

The present invention relates to a variable waveguide impedance intended for use in a waveguide section which is connected as load to an active microwave element in the form of a two pole or a four pole device for measurement, calibration and field tests of the element. More specifically the invention relates to a variable waveguide impedance with which a more precise investigation can be made of an active microwave element than has been possible with previously known devices.

Within the microwave technique, active microwave elements are used in the form of two pole or four pole devices, such as klystrons, cavity semiconductor oscillators, amplifiers, etc. The problem with such elements within the microwave range is that it is not possible in the same simple way as with corresponding elements within lower frequency ranges, by means, for example, of equivalent circuits or the like, to determine the characteristics of the microwave element in the circuit in which it is connected. It is therefore necessary to determine certain defined quantities and diagrams for the element in question. An example of this is the figure of merit Q for microwave oscillators and the so-called Rieke diagram. For determinination of such a diagram, a variable load is connected to the object to be measured, the phase and amount of the reflection factor therewith being determined. In the Smith diagram for the load this gives a family of circles, the radius of each circle indicating the absolute value of the reflection factor. From these values the Rieke diagram can be plotted for the object by measurement of frequency and output power. Common to measurements on active microwave two pole or four pole device of the aforesaid kind is that a variable load is used which with great accuracy can present reproduceable reflection factors, and the microwave element is examined over the entire impedance plane by varying the amount of the reflection factor between 0 and 1 and its phase between 0 and $2\pi$ radians.

As is known, a variable attenuator and a displaceable short-circuit device connected to the object to be measured can be used as a load for this purpose. Another known method is to use the waveguide section connected to the object to be measured and to incorporate a non-reflecting terminator and a matching tuning screw so arranged that both the absolute value and the phase of the reflection factor can be set with the tuning screw. Through the use of hybrids such as 3-db direction couplers, phase shifters and the aforesaid devices, other variants for the same purpose can also be built up. The disadvantage of the known devices is the high base or residual reflection due to the fact that commercial attenuators and tuning screws have a certain minimal reflection. This may give rise to errors of an order of about 5 percent when adjusting the reflection factor. Another disadvantage in the calibration of the object to be measured is that known devices are not suited for reading of the adjusted component within the 0.1 db range. It is admittedly possible within this range to make use of a "rotary-vane" attenuator with which the reading can be made more precisely than with conventional attenuators. However, owing to mode conversion between rectangular and circular waveguide, the latter has too high a residual reflection ($\Gamma=0.07$). Using conventional attenuators and short-circuit devices assembled to one unit, furthermore, the disadvantage arises that, in addition to being calibrated independently, the latter must be calibrated jointly in order to be able to determine the absolute value and phase of the reflection factor correctly.

One object of the present invention is to achieve a variable waveguide impedance for the measurement of certain specific quantities of an active microwave element, which impedance has a greater compactness and a smaller base attenuation and base reflection compared with previously known devices, whereby the error in measurement can be kept low.

Another object of the present invention is to achieve a variable waveguide impedance which, differently from known impedances of the same kind, needs to be calibrated only once.

Briefly, the principle of the device according to the present invention is to assemble in a single waveguide section a non-reflecting terminator and a short-circuit device not in conductive contact in such a way that they are movable in relation to one another and jointly movable along the waveguide section. For the measurement on the microwave element the element is connected to the waveguide section. Since the relative positions of terminator and short-circuit device are variable, reflection factors between a minimal absolute value determined by the quality of the terminator and a maximal absolute value determined by the quality of the short-circuit device can be adjusted. The phase of the reflection factor can be adjusted by displacement both of the terminator and the short-circuit device.

The invention is characterized as appears from the appending claims.

Figure 2:
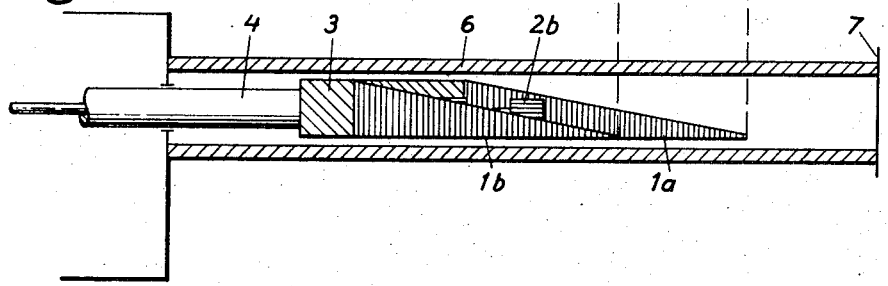
Figure 3:
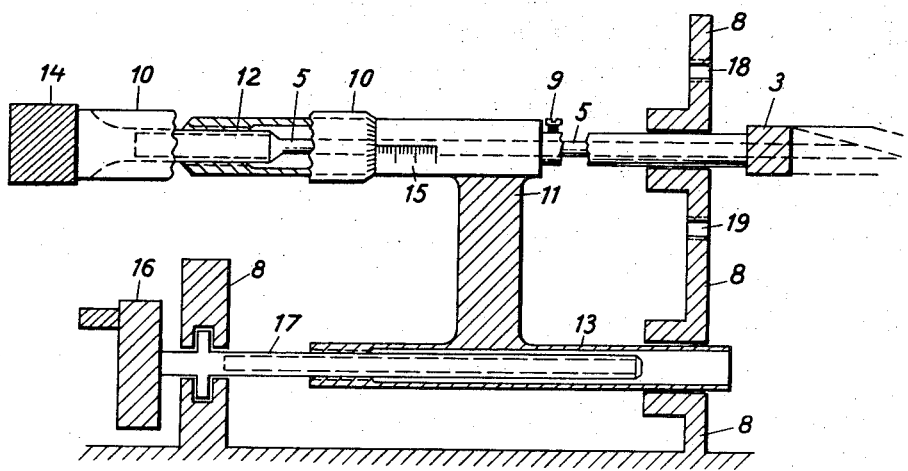

One embodiment of the invention will now be described with reference to the accompanying drawing, in which FIG. 1 is a top view of a variable waveguide impedance according to the invention, partly in cross-section, FIG. 2 is a side view of the impedance of FIG. 1, partly in cross-section, and FIG. 3 shows in the form of a side view, partially in cross-section, how the waveguide impedance is mounted on a stand with associated measuring apparatus.

FIG. 1 shows the variable waveguide impedance according to the invention inserted in a waveguide section the wave impedance of which is known. The actual impedance consists of a terminator 1a, 1b and a short-circuit device 2a,2b. Both parts of the terminator are placed on a yoke 3 of metallic material, which in turn is mounted on a shaft 4. Both parts 2a,2b of the short-circuit device are mounted on a shaft 5 of smaller cross-sectional area than that of shaft 4. Since shaft 4 is hollow, shaft 5 can be moved relative to it, whereby the position of the short-circuit device relative to the terminator can be varied. One extreme position of the short-circuit device is shown by dashed lines in FIG. 1. The movement takes place through the fact that shaft 5 is mechanically coupled to a micrometer device as will be described in conjunction with FIG. 3. By means of this micrometer device the waveguide impedance is calibrated so that, for a given position of the short-circuit device 2a,2b relative to the terminator 1a,1b, the absolute value of the reflection factor can be read on the scale of the micrometer device. Shaft 4 is connected to a crank device shown in FIG. 3 which, like the micrometer device, is mounted on a stand 8. The stand accommodates the waveguide section 6, which is intended both to enclose the variable waveguide impedance and to be connected to the object under measurement. By turning said crank device, as will be described in conjunction with FIG. 3, the waveguide imepdance can be moved relative to the stand and waveguide section, whereby the phase of the reflection factor can be varied.

FIG. 3 illustrates schematically the mounting of the micrometer device and the crank device on stand 8. The micrometer device 10 with associated scale 15 is placed on a support 11 which is rigidly connected to a guide cylinder 13. The shaft 4 and guide cylinder 13 are displaceably mounted in stand 8, as shown in the figure, and shaft 4 is rigidly connected to the fixed portion of the micrometer device. Shaft 5, the end of which is formed as the setting knob 14 of the micrometer device, is screwed into a threaded portion 12 of the fixed part of the micrometer device. When the knob 14 is turned, the shaft 5 will be displaced relative to the support 11, whereby shaft 5 is displaceable in relation to shaft 4 in dependence on the preset value on scale 15 of the micrometer device corresponding to different values of the absolute value of the reflection factor. By 16 is denoted the crank device by means of which a shaft 17 can be turned, which is in threaded connection with the guide cylinder 13. As appears from the figure, however, the shaft 17 is fixed in its axial position relative to the stand 8, for which reason, on rotation, the guide cylinder 13 is moved relative to the stand. In this way the entire micrometer device 10 and shafts 4,5 are jointly moved relative to the stand 8 when the crank device 16 is turned, whereby the phase of the reflection factor can be adjusted. The crank device 16 can be coupled to a counter mechanism (not shown), whereby it is possible to calibrate the value of the phase of the reflection factor. By means of the screw 9 the position of the shaft section 12 can be fixed in relation to shaft section 11, so that the position of shaft 5 is fixed in relation to that of shaft 4. By 18,19 are denoted two threaded holes in the stand 8 in which the waveguide section 6 can be fastened by screws as shown in FIGS. 1, 2.

The terminator consists of two absorbing pyramids $1a,1b$, which are of the same dimension and give very low reflection. Each pyramid is preferentially formed with a rectangular base and so that one lateral surface forms a right angle with the base, which lateral surface either faces the corresponding lateral surface of the other pyramid or, conversely, faces away from said lateral surface as shown in FIG. 1. The base of each pyramid is mounted on the yoke 3 one arm of which is preferentially longer than the other so that the apices of the pyramids are displaced in relation to each other in the longitudinal direction of the waveguide section. The length of the displacement d should preferentially be one quarter wavelength of the wave occurring in the waveguide, so ensuring that the wave reflected from the apex of pyramid $1b$ after reflection from this apex is displaced in phase one half wavelength in relation to the wave reflected from the apex of pyramid $1a$. In this way a minimum value of the absolute value of the reflection factor of an order of magnitude of 0.01 can be achieved.

The short-circuit device consists of two metallic cylinders $2a,2b$ of a design known per se, for example with circular cross-section. This form of short-circuit device is suitable in the present case as it can easily be moved in the space between the two pyramids $1a,1b$. The distance between the two cylinders $2a,2b$ should be as small as possible so that the distance between the two extreme positions of the short-circuit device is not too large. Furthermore the cross-section of shaft section 20 between the two cylinders should be rather smaller than the cross-section of shaft 5. It is also possible to use more than two cylinders a short-circuiting element. These must in such case have the property of high impedance for the microwave field in the waveguide section at one of their cross-sectional surfaces and of low impedance at the other so as to ensure alternate high and low impedance matching.

The active microwave element to be studied is connected to the waveguide section 6 via the flange 7. It is now possible to set different values of the reflection factor both as to its absolute value and phase, so obtaining a variable load for the microwave element to be studied. By turning the crank device 16 the shafts 4 and 5 will jointly be displaced relative to the stand 8, so varying the phase angle of the reflection factor. By instead setting the micrometer device to different values, the short-circuit device $2a,2b$ is displaced relative to the terminator $1a,1b$, so that different values of the absolute value of the reflection factor can be obtained. The amount of the reflection factor should suitably be set first by adjusting the micrometer device to the desired position. The short-circuit device is then locked to the terminator mechanism with locking screw 9. The phase of the reflection factor is set thereafter by adjusting the desired value on the counter mechanism connected to shaft 5 with the crank device 16.

The terminator should preferably be of ferrite material and one may either use the same material both for terminator and yoke or the yoke may consist of solid metallic materal such as a copper alloy. The terminator may also be made of metallized dielectric, for example of glass with metal film coating.

The main advantage of the variable waveguide impedance according to the invention is its compactness, since there are no additional mechanical parts apart from those required for absorption and short-circuiting of the incoming microwave field, so that the field is not disturbed by unnecessary constructional parts in the waveguide section. Since the impedance forms an integral unit, it need be calibrated only once, unlike variable impedances of known kind with which one is forced first to calibrate the component units independently and again after each assembly of the impedance.

What is claimed is:

1. A variable waveguide impedance for the measurement and calibration of an active microwave element such as microwave two pole or four pole devices comprising a waveguide section for receiving a microwave field from the active microwave element,
    means for connecting said waveguide section as a load to the active microwave elements,
    a variable impedance means including a non-reflecting terminator and a short-circuiting device, said variable impedance means being disposed in said waveguide section and said short-circuiting device being symmetrical about the axis of the waveguide section and not being in electrically conductive contact with the part of said waveguide section situated wthin the microwave field, means for displacing said short circuit device along the longitudinal axis of the waveguide section and relatively to said terminator in order to adjust the absolute value of the reflection factor for the active microwave element and means for displacing simultaneously said terminator and said short-circuit device along the longitudinal axis of said waveguide section in order to adjust the phase of the reflection factor for said active microwave element.

2. A variable waveguide impedance as claimed in claim 1, wherein said terminator consists of two pyramidal parts, a supporting means extending in the transverse direction of said waveguide section, the bases of said pyramidal parts mounted on said supporting means, a first displaceable and hollow shaft fitted to said supporting means, a number of alternately high and low impedance means comprising cylindrical metallic parts forming said short circuit device, a second displaceable shaft for fitting said metallic parts at mutually fixed longitudinally displaced positions, said second shaft being concentric with said first shaft and lockable in the same.

3. A variable waveguide impedance as claimed in claim 2, wherein an adjusting portion consists of a first displacing device for the simultaneous displacement of the two shafts and of a second displacing device for the displacement of said second shaft in relation to said first shaft.

4. A variable waveguide impedance as claimed in claim 3, wherein said first displacing device comprises a guide cylinder which, through rotation of a shaft screwed into it, can be displaced in the longitudinal direction of the waveguide section in order simultaneously to carry with it said second displacing device in which both shafts are secured, said second displacing device being rigidly connected to said first shaft and, through a screw thread, engaging with said second shaft whose end of which is formed as a knob of a micrometer screw.

5. A variable waveguide impedance as claimed in claim 2, wherein said supporting means consists of a yoke which is of the same material as said pyramidal parts.

6. A variable waveguide impedance as claimed in claim 5, wherein said yoke consists of metallic material and said pyramidal parts consists of a ferrite material.

7. A variable waveguide impedance as claimed in claim 2, wherein said pyramidal parts are so fitted to said supporting means that their apices are displaced in the longitudinal direction of the waveguide section and that one lateral surface of each of said pyramidal parts forms a right angle with the surface of engagement with said supporting means.

8. A variable waveguide impedance as claimed in claim 7, wherein said lateral surface of each of said pyramidal parts faces the inner wall of the waveguide section.

9. A variable waveguide impedance as claimed in claim 2, wherein said pyramidal parts are so fitted to said supporting means that their apices are displaced in the longitudinal direction of the waveguide section by one quarter of an operating wavelength.

* * * * *